United States Patent [19]

Gardner

[11] Patent Number: 4,573,434
[45] Date of Patent: Mar. 4, 1986

[54] PET WATERING APPARATUS

[75] Inventor: Robert P. Gardner, Tulsa, Okla.

[73] Assignee: Fred C. Clark, Oklahoma City, Okla.

[21] Appl. No.: 629,775

[22] Filed: Jul. 11, 1984

[51] Int. Cl.[4] ............................................. A01K 7/00
[52] U.S. Cl. ..................................................... 119/77
[58] Field of Search ............................ 119/51.5, 75, 77

[56] References Cited

U.S. PATENT DOCUMENTS

| 2,573,802 | 11/1951 | Mitchell | 119/77 |
| 3,720,184 | 3/1973 | Pearce | 119/51.5 |
| 3,730,141 | 5/1973 | Manning et al. | 119/77 X |
| 4,134,365 | 1/1979 | Futers et al. | 119/77 X |

FOREIGN PATENT DOCUMENTS 2368220  6/1978  France ................................ 119/77

Primary Examiner—Robert P. Swiatek
Attorney, Agent, or Firm—Laney, Dougherty, Hessin, Claro & Beavers

[57] ABSTRACT

A pet watering apparatus for automatically providing water for animals. A one-piece apparatus is disclosed which includes a bottle holder for holding at least one bottle in an inverted position, utilizing such bottle as a water storage tank. Water is automatically drained from the bottle and retained by a water reservoir so that it is readily available for drinking by animals.

14 Claims, 4 Drawing Figures

U.S. Patent  Mar. 4, 1986  4,573,434
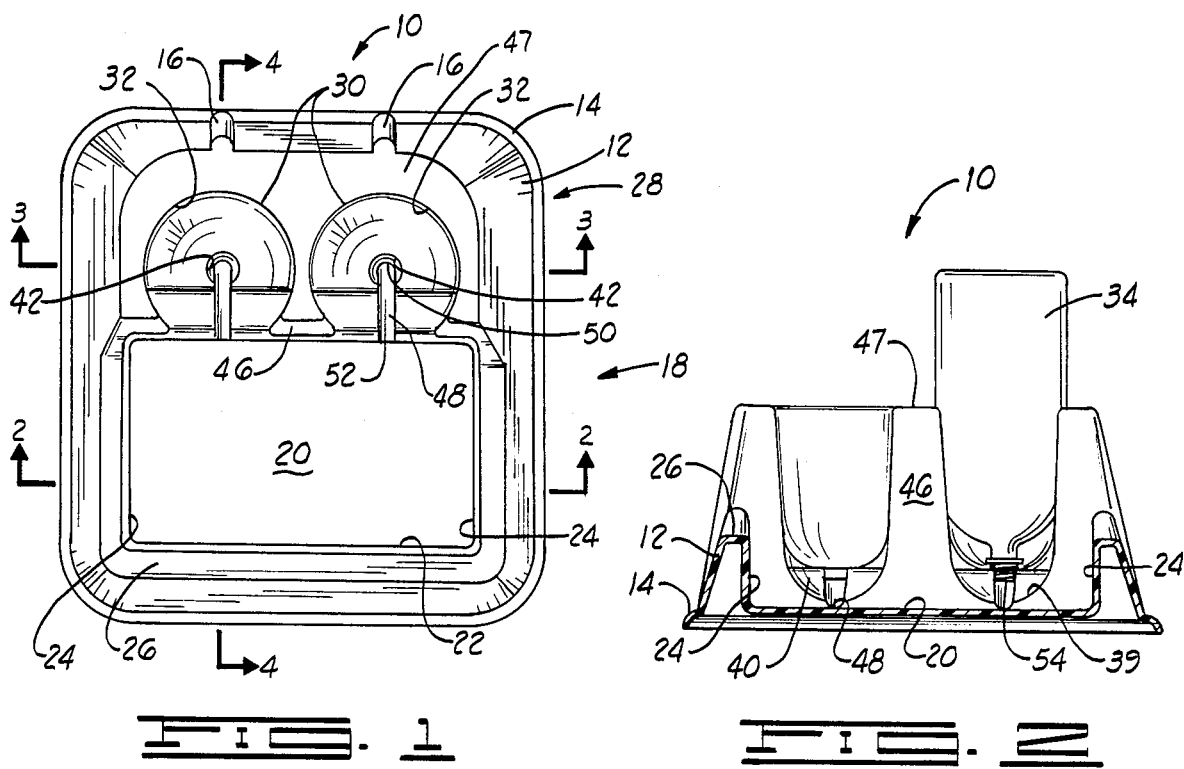
FIG. 1
FIG. 2
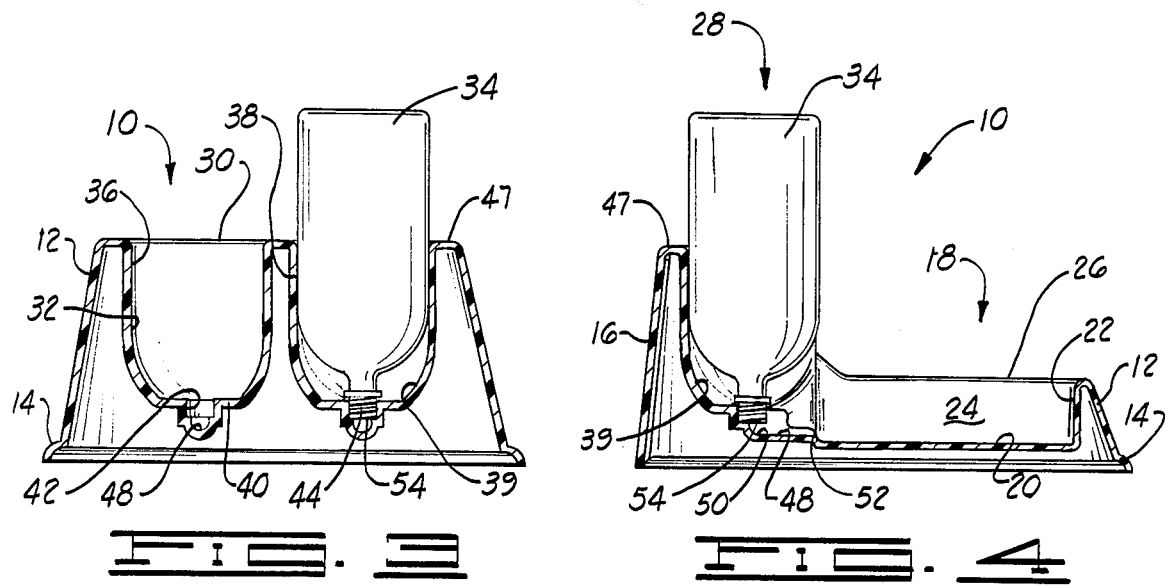
FIG. 3
FIG. 4

PET WATERING APPARATUS

BACKGROUND OF THE INVENTION

1. Field of the Invention

This invention relates to pet waterers for automatically providing water to animals over a period of time, and more particularly, to a pet waterer utilizing at least one commonly available soft drink bottle as a storage tank.

2. Description of the Prior Art

The prior art relating to pet waterers is directed primarily at devices utilizing a specially made storage tank and means for making the water in the storage tank available to animals. Such devices tend to be expensive and bulky when not in use. The present invention is of one-piece, molded construction and utilizes at least one commonly available soft drink bottle for water storage rather than a specially made tank. The result is a pet waterer of considerably less expense and one which is easily stored when not in use.

SUMMARY OF THE INVENTION

The pet watering apparatus of the present invention is designed to automatically provide water to animals for drinking.

The apparatus is made of flexible material of one-piece construction. A portion of the apparatus forms a water reservoir section having a lower surface and substantially vertical walls extending upwardly therefrom.

An upwardly extending bottle holding section defining a pair of bottle holders forms a portion of the apparatus adjacent the water reservoir section. Each bottle holder has a curvilinear inner surface dimensioned to frictionally hold an outer surface of a bottle, and particularly a two-liter, plastic soft drink bottle.

A shoulder extends inwardly from the curvilinear surface of each bottle holder and defines a bottle neck receiving recess dimensioned to frictionally hold a neck of the bottle, the neck normally being externally threaded. The curvilinear surface and the bottle neck receiving recess of the bottle holder operate to retain and support the bottle in a substantially inverted position.

An upwardly opening water conduit connects each bottle neck receiving recess with the water reservoir section adjacent the lower surface thereof.

In operation bottles are filled with water and installed in an inverted position in a bottle holder. Water drains out of the bottles and into the reservoir section. The water level rises until it reaches the opening of the bottles at which point water automatically ceases to flow. As the water level is lowered, such as by a drinking animal or by evaporation, an additional quantity of water automatically will drain from the bottles into the reservoir section. The bottles thus act as storage tanks to provide a constant supply of fresh water for drinking.

An important object of the invention is to provide a supply of fresh water to animals automatically over a period of time.

Another object of the invention is to provide a pet watering apparatus which utilizes at least one bottle as a water storage tank.

A further object of the invention is to provide a pet watering apparatus of low cost, one-piece construction.

Additional objects and advantages of the invention will become apparent as the following detailed description of the preferred embodiment is read in conjunction with the accompanying drawings which illustrate such preferred embodiment.

BRIEF DESCRIPTION OF THE DRAWINGS

FIG. 1 shows a plan view of a pet watering apparatus of the present invention.

FIG. 2 is a section view taken along lines 2—2 in FIG. 1 and illustrating a bottle installed.

FIG. 3 shows a section viewed along lines 3—3 in FIG. 1 with a bottle installed.

FIG. 4 is a section view taken along lines 4—4 in FIG. 1, also showing a bottle installed in the apparatus.

DESCRIPTION OF THE PREFERRED EMBODIMENT

Referring now to the drawings, the pet watering apparatus of the present invention is designated generally by the numeral 10. Apparatus 10 is made of a flexible material of one-piece, molded construction having an outer wall 12 with a perimeter lip 14 at a lower edge thereof which acts as reinforcement. Further reinforcement is provided by a pair of spaced, substantially vertical ribs 16.

As illustrated in FIGS. 1 and 4, a portion of the apparatus forms a water reservoir section 18 which has a lower surface 20, a substantially vertical forward wall 22 and a pair of substantially vertical side walls 24 extending upwardly from the lower surface. Walls 22 and 24 define a first surface or edge 26.

An upwardly extending bottle holding section 28 forms a portion of apparatus 10 rearwardly of water reservoir section 18. A pair of bottle holders 30 is provided, each of which has a curvilinear inner surface 32 defining a bottle receiving cavity for holding a bottle 34. Each of ribs 16 corresponds to, and is adjacent, a bottle holder 30. In one embodiment, but not by way of limitation, bottle 34 is a conventional, two-liter, plastic, soft drink bottle nominally dimensioned to have a substantially cylindrical portion 5.3 inches long with an outside diameter of 4.3 inches, an overall height of 11.9 inches, an externally threaded neck with an outside diameter of 1.1 inches and a neck outside length of 0.75 inches.

As best shown in FIG. 3, an upper holding portion 36 of curvilinear surface 32, which in the preferred embodiment is substantially cylindrical, is dimensioned to conform to, and frictionally hold, an outer surface 38 of bottle 34. If a bottle is used which is relatively less flexible than the apparatus, holding portion 36 will be radially outwardly and elastically deformed to tightly grip outer surface 38 of bottle 34. If a bottle relatively more flexible than the apparatus is used, outer surface 38 of the bottle will be radially inwardly compressed so that each bottle holder 30 tightly grips a bottle. Thus, either holding portion 36 or outer surface 38 is relatively more flexible than the other. In the preferred embodiment, the apparatus is made of plastic which is relatively less flexible than a conventional, plastic, soft drink bottle.

An intermediate portion 39 of surface 32 curvilinearly tapers inwardly from upper holding portion 36. In the preferred embodiment, intermediate portion 39 does not contact bottle 34.

Referring still to FIG. 3, a shoulder 40 extends inwardly from intermediate portion 39 of surface 32 at a lower end thereof and defines a substantially cylindrical bottle neck receiving recess 42 coaxial with cylindrical holding portion 36. Bottle neck receiving recess 42 is dimensioned to frictionally hold neck 44 of bottle 34. The present invention is adapted to accommodate a bottle with an externally threaded neck, but is not limited to such bottle configuration. Bottle neck receiving recess 42, and therefore also bottle neck 44, are positioned below upper edge 26 of walls 22 and 24. Thus, holding portion 36 of curvilinear surface 32 and bottle neck receiving recess 42 operate to retain and support bottle 34 in a substantially inverted position.

Curvilinear surface 32 is longitudinally truncated by substantially vertical wall 46 as best shown in FIGS. 1 and 2, such that the cavity formed by the curvilinear surface opens toward reservoir section 18. Thus, each curvilinear inner surface 32 of bottle holder 30, wall 46, walls 24 and wall 22 form a water retaining boundary of a reservoir, as is also illustrated in FIG. 4. A second upper surface 47 connects bottle holders 30 with outer wall 12.

An upwardly opening water conduit 48 interconnects each bottle holder 30 with reservoir section 18. A first end 50 of conduit 48 opens upwardly into bottle neck receiving recess 42 as best seen in FIGS. 1 and 4. A second end 52 of conduit 48 forms an opening in wall 46 adjacent lower surface 20 of reservoir section 18.

In operation, at least one bottle 34 is filled with water and installed in a substantially inverted position in a bottle holder 30 such that neck 44 of the bottle fits into bottle neck receiving recess 42. Water drains out of opening 54 of bottle 34, through bottle neck receiving recess 42 into first end 50 of water conduit 48, and then flows through the conduit, past second end 52 and into water reservoir section 18. The water level rises until it reaches opening 54 of bottle 34 at which point water automatically ceases to flow out of the bottle. Reservoir section 18 is sized such that only a small portion of the water contained in bottles 34 is required to fill the reservoir to the level of edge 54. Bottles 34 thus act as storage tanks of water for later use. As the water level is lowered below opening 54, such as by drinking by an animal or by evaporation, an additional quantity of water automatically will drain from the bottles to refill reservoir section 18 to the level of opening 54 of the bottles. The bottles can be filled and the apparatus left unattended for extended periods of time to provide a constant supply of fresh water for drinking by animals.

It can be seen, therefore, that the pet watering apparatus of the present invention is well adapted to carry out the objects and attain the ends and advantages mentioned, as well as those inherent therein. While a presently preferred embodiment of the invention has been described for the purposes of this disclosure, numerous changes in the construction and arrangement of the features may be made by those skilled in the art. All such changes are encompassed within the scope and spirit of this invention as defined by the appended claims.

What is claimed is:

1. A pet watering apparatus comprising:
   an outer wall portion;
   an inner, upwardly opening water reservoir section comprising:
      a lower surface; and
      a plurality of walls extending upwardly from said lower surface and forming a first portion of a water-retaining boundary for said reservoir section;
   a first upper surface connecting said first portion of said water-retaining boundary to said outer wall;
   at least a first and second bottle holder forming a second portion of said water-retaining boundary, each of said bottle holders comprising:
      a longitudinally truncated first substantially cylindrical upper portion dimensionally conforming to an outer surface of a bottle to frictionally hold said bottle in an inverted position;
      an inwardly extending lower shoulder portion having a second cylindrical surface coaxial with said cylindrical upper portion and dimensionally conforming to an outer surface of a neck of said bottle to frictionally hold said neck, said second cylindrical surface defining a recess arranged to be in communication with an opening of said bottle adjacent said neck; and
      a curvilinearly tapered intermediate section interconnecting said cylindrical upper portion and said lower shoulder portion;
   a second upper surface connecting said bottle holders to said outer wall; and
   a plurality of substantially horizontal upwardly opening water conduits, each conduit having a first end in communication with a bottle holder adjacent said recess thereof and a second end in communication with said water reservoir section adjacent said lower surface thereof;
   wherein said outer wall portion, said water reservoir section, said bottle holders, said first and second upper surfaces and said water conduits are integrally molded on one-piece construction.

2. The pet watering apparatus of claim 1 further comprising a bottle installed in each bottle holder, said bottles being separable from said bottle holders and acting as water storage tanks for providing a quantity of water to said reservoir section.

3. The pet watering apparatus of claim 2 wherein one of said first bottle holder and the bottle installed therein is more flexible than the other.

4. The pet watering apparatus of claim 3 wherein said first bottle holder is relatively less flexible than said bottle installed therein.

5. The pet watering apparatus of claim 2 wherein said bottles are two-liter bottles, each bottle having a substantially cylindrical portion with an outside diameter of approximately 4.3 inches and a neck outside diameter of approximately 1.1 inches.

6. The pet watering apparatus of claim 1 further comprising an outwardly extending lip along a lower perimeter of said outer wall.

7. The pet watering apparatus of claim 1 further comprising a substantially vertical reinforcing rib along said outer wall adjacent each bottle holder.

8. A pet watering apparatus comprising:
   an outer wall portion;
   an inner, upwardly opening water reservoir section comprising:
      a lower surface; and
      at least one wall extending upwardly from said lower surface and forming a first portion of a water-retaining boundary for said reservoir section;
   a first upper surface connecting said first portion of said water-retaining boundary to said outer wall;
   a bottle holder forming a second portion of said water-retaining boundary, said bottle holder comprising:

a longitudinally truncated first substantially cylindrical upper portion dimensionally conforming to an outer surface of a bottle to frictionally hold said bottle in an inverted position;

an inwardly extending lower shoulder portion having a second cylindrical surface coaxial with said cylindrical upper portion and dimensionally conforming to an outer surface of a neck of said bottle to frictionally hold said neck, said second cylindrical surface defining a recess arranged to be in communication with an opening of said bottle adjacent said neck; and a curvilinearly tapered intermediate section interconnecting said cylindrical upper portion and said lower shoulder portion;

a second upper surface connecting said bottle holder to said outer wall; and a substantially horizontal upwardly opening water conduit having a first end in communication with said bottle holder adjacent said recess thereof and a second end in communication with said water reservoir section adjacent said lower surface thereof;

wherein said outer wall portion, said water reservoir section, said bottle holder, said first and second upper surfaces and said water conduit are integrally formed in a one-piece construction.

9. The pet watering apparatus of claim 8 further comprising a bottle installed in said bottle holder, said bottle being separable from said bottle holder and acting as a water storage tank for providing a quantity of water to said reservoir section.

10. The pet watering apparatus of claim 9 wherein one of said bottle holder and said bottle installed therein is more flexible than the other.

11. The pet watering apparatus of claim 10 wherein said bottle holder is relatively less flexible than said bottle installed therein.

12. The pet watering apparatus of claim 9 wherein said bottle is a two-liter bottle having a substantially cylindrical portion with an outside diameter of approximately 4.3 inches and a neck outside diameter of approximately 1.1 inches.

13. The pet watering apparatus of claim 8 further comprising an outwardly extending lip along a lower perimeter of said outer wall.

14. The pet watering apparatus of claim 8 further comprising a substantially vertical reinforcing rib along said outer wall adjacent said bottle holder.

* * * * *

UNITED STATES PATENT AND TRADEMARK OFFICE
CERTIFICATE OF CORRECTION

PATENT NO. :   4,573,434
DATED      :   March 4, 1976
INVENTOR(S):   Robert P. Gardner It is certified that error appears in the above-identified patent and that said Letters Patent are hereby corrected as shown below:

Column 4, line 32, delete "on" and insert --of-- therefor.

Signed and Sealed this

Fifth Day of August 1986

[SEAL]

Attest:

DONALD J. QUIGG

Attesting Officer       Commissioner of Patents and Trademarks